United States Patent [19]

Casad et al.

[11] 4,173,196
[45] Nov. 6, 1979

[54] SAFETY RELEASE FOR WATER SKIING TOW LINE

[75] Inventors: Edward F. Casad, St. Marys; Thomas R. Casad, Celina; Richard E. Jones, St. Marys, all of Ohio

[73] Assignee: Ajax Machine and Welding Co., St. Marys, Ohio

[21] Appl. No.: 840,585

[22] Filed: Oct. 11, 1977

[51] Int. Cl.² ............................................. B63B 21/56
[52] U.S. Cl. ................. 114/253; 24/230 AP; 294/83 R
[58] Field of Search .............. 114/253, 210, 217, 230; 24/115 K, 230 A, 230 AP, 241 S, 241 SP; 294/83 R, 84; 280/480

[56] References Cited

U.S. PATENT DOCUMENTS

| | | | |
|---|---|---|---|
| 2,418,702 | 4/1947 | DuPont | 294/83 R |
| 2,863,201 | 12/1958 | Craven et al. | 24/241 SP |
| 3,762,757 | 10/1973 | Epstein | 294/84 |
| 3,949,698 | 4/1976 | Sell | 114/253 |

FOREIGN PATENT DOCUMENTS

| | | | |
|---|---|---|---|
| 339014 | 1/1919 | Fed. Rep. of Germany | 24/230 AP |
| 124297 | 3/1919 | United Kingdom | 294/83 R |

*Primary Examiner*—Charles E. Frankfort
*Attorney, Agent, or Firm*—Gust, Irish, Jeffers & Rickert

[57] ABSTRACT

A safety release for water skiing tow lines comprising a U-shaped body having a rearwardly facing slot therein, a mounting bracket for securing the device to a ski pylon, a release arm pivotally secured to the body and including a bolt which extends across the slot when the arm is in a vertical position so as to engage the terminal loop of the ski rope. When the arm is pulled forwardly by means of a trip line operated from within the boat, the bolt is retracted out of the slot thereby releasing the tow line. Adjustable spring biased detents are provided for locking the release handle in the open and closed positions.

11 Claims, 5 Drawing Figures

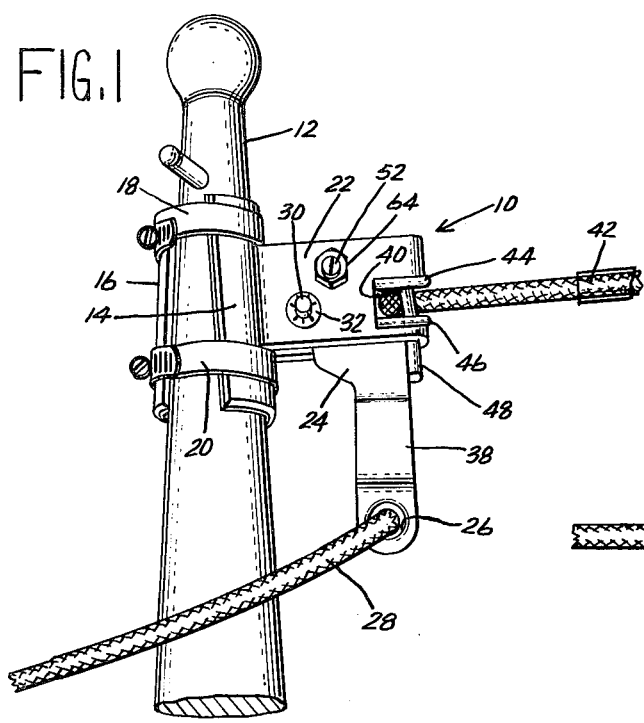
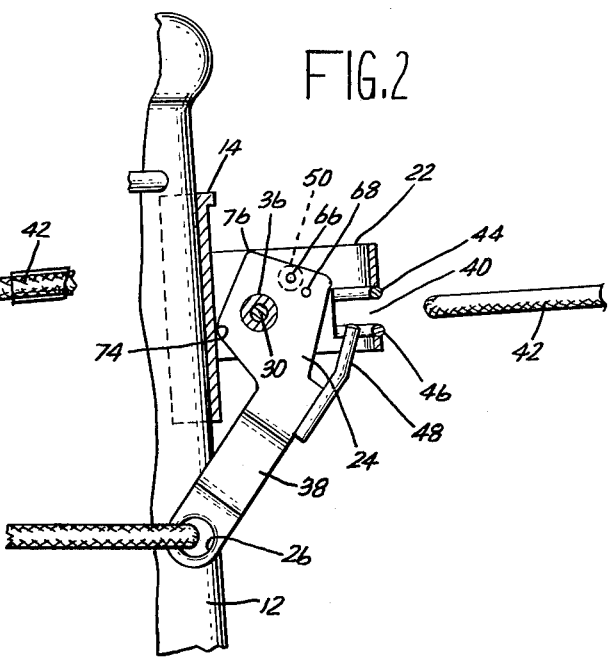
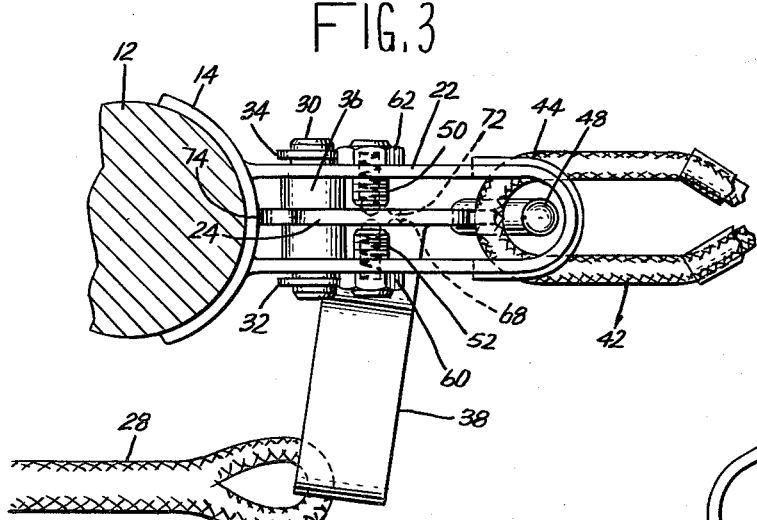
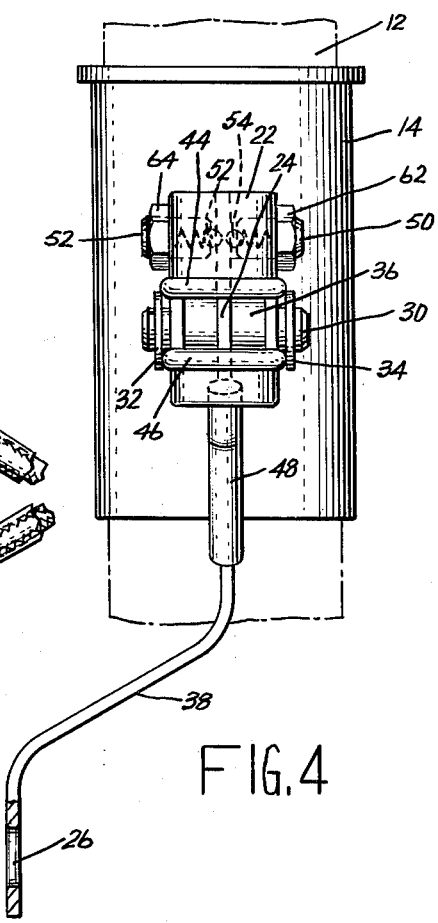
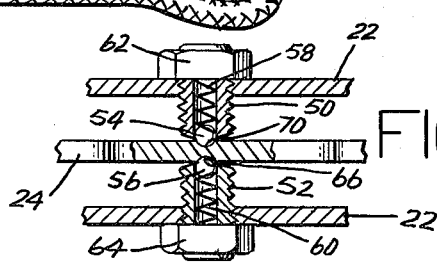

SAFETY RELEASE FOR WATER SKIING TOW LINE

BACKGROUND OF THE INVENTION

The present invention relates to a tow line release device and in particular to a safety release for water skiing tow lines which is adapted for quickly releasing the tow rope upon manual actuation of a trip rope from within the boat.

In many types of water skiing, it is desirable from a safety standpoint to be able to quickly release tension on the tow rope should the skier fall. In trick skiing, for example, one maneuver includes the placement of the skier's foot in the ski rope handle and he is towed without the use of his hands. Should the skier fall while in this position, he is susceptible to serious leg injuries such as pulled muscles, a twisted knee or a broken leg and may even be dragged under water before the driver of the boat reacts and is able to stop the boat. Aside from the potential for injury, the necessity for the skier to be constantly on guard so that he is able to pull his foot out of the handle or tow strap in the case of a fall reduces his concentration on performing the maneuver.

In addition to accidents resulting because of a trick skier being unable to release his foot from the rope, many accidents occur as a result of the skier becoming entangled in the rope as it is towed from the boat even though he has released the handle. Also, in the case where two or more skiers are being towed at the same time and one skier falls, the loose rope jerks about in the water quite violently and is liable to strike one of the other skiers.

In order to avoid the type of accidents described above, it has been found advantageous to provide for quick release of the tow rope by means of a trip mechanism operated manually from within the boat. One class of prior art devices comprises a pivotally mounted finger which hooks a terminal loop in the ski rope and is retained in engaging position by means of a latch. When the latch is released, tension on the ski rope pulls the finger open thereby releasing the rope. Examples of this type of device include U.S. Pat. Nos. 3,110,331; 3,133,521; 52,385; 1,115,807; 3,205,545 and 2,721,088.

A disadvantage to this type of device is that the finger requires tension on the rope for it to open so that if the ski rope is momentarily slack, as is often the case in trick skiing, the finger will fail to open quickly. Furthermore, the open finger may present an obstacle which can catch the rope and continue to drag the skier. Although the finger in the aforementioned U.S. Pat. No. 2,721,088 is designed such that it drops by gravity to its open position when released, this renders it inherently slow to open in the case of a slack rope. In fact, the rope may even interfere with its opening.

A further example of a prior art tow rope release is shown in U.S. Pat. No. 3,583,355 which discloses a clamp for gripping the free end of the ski rope or bridle. When the release lever is pulled, the jaws of the clamp open thereby releasing the tow rope. Due to the fact that the tow rope is frictionally rather than positively engaged, it may pull loose during skiing, especially if the skier is performing maneuvers which result in a high degree of tension being applied to the rope. Furthermore, clamping of the rope in this manner is likely to result in premature rope wear.

A further drawback to pivoted finger type hitches is that the force exerted by the tow rope on the finger is in a direction which urges it towards its open position. Should the latch mechanism fail, the finger will open thereby releasing the rope and causing the skier to fall. Since this is most likely to occur when maximum tension to the rope is being applied by the skier, as in the case of slalom skiing, the sudden release of tension is more likely to cause injury.

SUMMARY OF THE INVENTION

The present invention overcomes the above-discussed disadvantages of the prior art by providing a release mechanism wherein a terminal loop in the rope is positively engaged by a bolt carried by a pivoted release arm. When the release arm is tripped, the bolt is positively retracted completely out of the loop receiving slot in the body of the mechanism so that release time is very short and there are no projections or other obstructions to interfere with the release of the rope even if it is in a slack condition.

The bolt and arm are locked in the closed position by means of an adjustable spring biased detent mechanism and inadvertent release of the rope is impossible, regardless of the degree of tension, because the force exerted on the bolt is in a radial direction with respect to the axis of rotation of the release arm. This is in distinction to the prior art devices wherein one component of the tension force vector is tangential to the axis of rotation of the rope engaging finger.

Specifically, the present invention is a safety release for water skiing tow ropes comprising: a body, a mounting bracket for securing the body to a towing boat, a rearwardly opening slot in the body adapted to receive a loop of rope therein, a bolt extending across the slot and closing the same so as to capture the loop of rope received in the slot, and a trip lever connected to the bolt for positively retracting the bolt out of the slot so that the loop of rope received therein is free to move out of the slot in an unobstructed manner.

It is an object of the present invention to provide a safety release for water skiing tow ropes wherein the rope is positively engaged by means of a rotatable bolt mechanism wherein the force exerted thereon by the rope acts in a direction which intersects its axis of rotation thereby reducing the chances of its being forced open.

Another object of the present invention is to provide a safety release for water skiing tow ropes having a rotatable bolt which completely clears the tow rope receiving slot upon actuation so that the tow rope is able to clear the slot in an unobstructed manner.

A further object of the present invention is to provide a safety release for water skiing tow ropes wherein the rope engaging bolt is locked both in its open and closed positions by means of an adjustable detent mechanism.

A still further object of the present invention is to provide a safety release for water skiing tow ropes which eliminates the need for the skier to concentrate on pulling his foot out of the handle or tow strap if a fall occurs thereby permitting him to devote more concentration on the performance of the skiing maneuver in question.

Yet another object of the present invention is to provide a safety release for water skiing tow ropes which will release the rope quickly and cleanly regardless of whether the rope is taut or slack.

A still further object of the present invention is to provide a safety release for water skiing tow ropes which is adapted to be mounted to a skiing pylon and includes an offset trip lever so as to permit unobstructed actuation from the front of the towing boat.

BRIEF DESCRIPTION OF THE DRAWINGS

The above-mentioned features and objects of this invention and the manner of attaining them will become more apparent and the invention itself will be best understood by reference to the following description of an embodiment of the invention taken in conjunction with the accompanying drawings, wherein:

FIG. 1 is a perspective view showing the release mechanism of the present invention mounted to the ski pylon of a towing boat, wherein the mechanism is in the closed position and a tensioned tow rope is engaged thereby;

FIG. 2 is a side elevational view partly in section of the release mechanism in its open position with the tow rope disengaged;

FIG. 3 is a top plan view thereof;

FIG. 4 is a front elevational view thereof; and

FIG. 5 is an enlarged sectional view of the detent mechanism as viewed from the top.

DESCRIPTION OF THE PREFERRED EMBODIMENT

Referring now to the drawings, the release mechanism 10 of the present invention is shown mounted to a ski pylon 12 which in turn is mounted to the deck, transom, etc. of the towing boat. Mounting is effected by means of an arcuate clamping bracket 14 and back plate 16 which are clamped to pylon 12 by adjustable clamp straps 18 and 20. Either integrally formed with or welded to bracket 14 is a U-shaped body 22. Bracket 14, back plate 16, straps 18 and 20 and body 22 are preferably made of high strength stainless steel so as to resist rusting and corrosion.

Pivotally mounted within body 22 is a stainless steel release arm 24 which has an eye 26 at the lower end thereof adapted to have a trip line 28 looped therethrough. Arm 24 is connected to body 22 by means of pivot pin 30 which extends through arm 24 and body 22 and is retained in place by means of snap washers 32 and 34. A sleeve 36, which is welded to arm 24, is rotatably received over pin 30. Sleeve 36 maintains arm 24 centered within body 22 as shown in FIG. 3. The downwardly depending portion 38 of arm 24 is offset as shown in FIG. 4 so that it clears pylon 12 when jerked rearwardly by trip line 28. This enables the mechanism 10 to be operated from the front seat of the boat.

Body 22 includes a rearwardly opening slot 40 in both sides which is substantially coplanar with the axis of rotation of pivot 30 within a generally horizontal plane. Because the position at which the rope is gripped by the skier is often slightly higher than the release mechanism 10, this "horizontal plane" may be at a slight angle to the surface of the water as shown in FIGS. 1 and 2. Of course, depending on the boat design, the angle of the tow rope 42 with respect to the surface of the water may vary. For purposes of this description and the appended claims, then, the term "horizontal plane" means that plane which is horizontal in one orthogonal direction and is defined by the angle of the tow rope 42 when tensioned in normal use in the other orthogonal direction. As mentioned above, in most cases this plane will be very close to a true horizontal plane.

Slot 40 is provided with edge beads 44 and 46 which protect tow rope 42 against being frayed or cut by contact with the sharp edges of body 22. Bolt means including a cylindrical bolt or pin 48 essentially parallel to lever 38 is fixedly secured to arm 24 as by welding and, as shown in FIG. 1, extends completely across slot 40 when arm 24 is in its closed position. When arm 24 is pulled to its open position shown in FIG. 2, bolt 48 is retracted completely out of slot 40 so that tow rope 42 will slip out of slot 40 in an unobstructed manner. It will be noted that bolt 48, when in its closed position (FIG. 1), forms an angle of approximately 10° with the horizontal plane and is tangential to an imaginary arc defined about pin 30, which is the axis of rotation of arm 24. Because the portion which is engaged by tensioned tow rope 42, slot 40 and pin 30 being coplanar within the horizontal plane defined by tow rope 42, all of the force exerted by rope 42 on bolt 48 is along a direction which intersects pivot pin 30. Accordingly, tensioned tow rope 42 exerts no rotational forces on arm 24 and the possibility of arm 24 being rotated towards its open position by rope 42 is not present.

A pair of hollow members 50 and 52 are threaded into body 22 in opposing relationship and include steel balls 54 and 56, respectively, captured in the end thereof. Balls 54 and 56 are urged into contact with arm 24 by means of compressed springs 58 and 60 respectively. The tension of balls 54 and 56 on plate 24 can be adjusted by loosening lock nuts 62 and 64, screwing members 50 and 52 toward or away from arm 24 and then retightening lock nuts 62 and 64. Arm 24 includes a pair of indentations 66 and 68 on one side thereof and identically positioned indentations 70 and 72 on the other side thereof. Indentations 66 and 70 are positioned such that they capture balls 56 and 54 when arm 24 is rotated to its open position as shown in FIGS. 2, 3, 4 and 5 and indentations 68 and 72 are positioned such that they capture balls 56 and 54 when arm 24 is rotated to its closed position as shown in FIG. 1. The release tension for arm 24 may be adjusted by screwing members 50 and 52 toward or away from arm 24 as mentioned previously. Corners 74 and 76 serve as positive stops against bracket 14 in the open and closed positions, respectively.

In use, arm 24 is pulled forwardly to the position shown in FIG. 2 and the terminal loop of tow rope 42 is inserted in slot 40. Arm 24 is then rotated rearwardly until balls 54 and 56 are captured in indentations 68 and 72, and the mechanism is now locked in its closed position. In the event the skier should fall or it otherwise becomes necessary to release rope 42, trip rope 28 is jerked by the driver or ski watcher thereby rotating arm 24 forwardly and retracting bolt 48 out of slot 40. All tension is removed from rope 42 and it is free to move out of slot 40.

While there have been described above the principles of this invention in connection with specific apparatus, it is to be clearly understood that this description is made only by way of example and not as a limitation to the scope of the invention.

What is claimed is:

1. A safety release for water skiing tow ropes comprising:
   a body having spaced sides, each side having first and second opposite end portions, said first end portions being rigidly secured together, a lever disposed in substantial parallelism with and between said sides, said lever having an arm extending from between said sides and in a direction transversely of a longitudinal axis on said body which extends between said end portions, said second end portions of said sides having laterally registered slots opening therethrough defining a single slot which is substantially coplanar with said longitudinal axis, said lever being pivotally connected to said sides at a location substantially on said longitudinal axis so as to be swingable in substantial parallelism with said sides between first and second positions, bolt means disposed between in substantial parallelism with said sides and movable between a first position spanning and a second position clearing said slots, said bolt means in its first position extending transversely of said longitudinal axis, said lever having a connection with said bolt means to move the latter from its first to its second positions when said lever is moved from its first to its second positions, respectively, a rope-receiving clearance provided between said bolt means and the inner ends of said slots when said bolt means is in its first position.

2. The safety release of claim 1 wherein said bolt means extends substantially parallel to said lever arm when both are in the first positions thereof.

3. The safety release of claim 2 wherein said bolt means is an elongated rigid element rigidly secured at one end to said lever to dispose the portion of said element when in its first position and which spans said slot substantially perpendicular to said longitudinal axis.

4. The safety release of claim 2 including a bracket member rigidly securing said first end portions together, and detent means for releasably holding said lever alternatively in its first and second positions.

5. The safety release of claim 1 wherein said lever arm has an end portion offset laterally from said bracket member for connecting a release rope thereto.

6. The safety release of claim 4 wherein said detent means comprises a hollow member having a ball captured therein and extending beyond one end thereof, spring means contained within said hollow member for biasing said ball towards said one end, said hollow member being threadedly secured to said body and positioned such that said ball is in contact with said arm and is captured by said indentation when said element is positioned within said slots.

7. The safety release of claim 6 including a second indentation positioned to capture said ball when said arm is rotated to a second position wherein said bolt is positioned out of said slot.

8. The safety release of claim 4 wherein said lever is provided with spaced abutment portions alternatively engageable with said bracket member to stop said lever in its selected first and second positions, respectively.

9. The safety release of claim 8 wherein said bolt means is an elongated rigid element rigidly secured at one end to said lever to dispose the portion of said element when in its first position and which spans said slot substantially perpendicular to said longitudinal axis.

10. The safety release of claim 9 wherein said second end portions of said body are rigidly joined together with said single slot opening therethrough, said bracket member having a mounting portion which extends substantially parallel to said lever arm when said lever is in its first position, and means on the distal end of said lever arm for connecting a release rope thereto.

11. The combination of claim 10 wherein said bracket member is mounted to a ski pylon and said arm is offset to clear said pylon.

* * * * *

UNITED STATES PATENT AND TRADEMARK OFFICE
CERTIFICATE OF CORRECTION

PATENT NO. : 4,173,196
DATED : November 6, 1979
INVENTOR(S) : Edward F. Casad et al It is certified that error appears in the above–identified patent and that said Letters Patent are hereby corrected as shown below:

Claim 5, Col. 6, Line 1,     "1" should be ---- 4 ----

Signed and Sealed this

Eighth Day of April 1980

[SEAL]

Attest:

SIDNEY A. DIAMOND

Attesting Officer     Commissioner of Patents and Trademarks